April 15, 1952  A. E. HARROLD  2,592,802
ELECTRICAL INDUCTOR

Filed Sept. 3, 1949  2 SHEETS—SHEET 1

INVENTOR
ARTHUR EDWARD HARROLD

BY
ATTORNEY

Patented Apr. 15, 1952

2,592,802

UNITED STATES PATENT OFFICE 2,592,802

ELECTRICAL INDUCTOR

Arthur Edward Harrold, Wyken, Coventry, England, assignor to The General Electric Company Limited, London, England Application September 3, 1949, Serial No. 113,970
In Great Britain September 7, 1948

9 Claims. (Cl. 175—21)

1

The present invention relates to electrical inductors. The invention is more particularly, but not exclusively, concerned with inductors used in conjunction with electrical signalling along power distribution systems, where the inductors are used to isolate one section of the system from another at the signalling frequency.

One known method of making such inductors is to wind the coil with wire or strip and to clamp the turns between suitable insulators. This method is relatively expensive however, and the resultant inductor has a limited temperature range which is a disadvantage when the inductor is for use under tropical conditions.

One object of the present invention is to provide an improved form of electrical inductor particularly adapted for use in conjunction with electrical signalling along power distribution systems.

According to the present invention an electrical inductor element consists of a coil having formed integral therewith spacing members which project from each turn, said spacing members being adapted so that insulating members can be fitted between the opposing ends of spacing members projecting from adjacent turns, the arrangement of said spacing members and said insulating members being such that they are adapted to oppose axial compressive forces tending to move adjacent turns more closely together and to oppose tangential forces tending to cause relative movement between turns.

The inductor is preferably supported at one end by mounting lugs formed integrally with the coil. Tensioning means may be provided between the two ends of the coil.

One method of manufacturing an electrical inductor embodying the present invention comprises the steps of casting a coil member consisting of a plurality of turns traversed by three or more longitudinal members, cutting, for example by slotting or drilling and slotting, the portions of said members lying between adjacent turns in order to isolate each turn from its neighbouring turns and to provide three or more pairs of opposed spacing members between each pair of adjacent turns, and by said cutting, or subsequently, forming an aperture of predetermined shape between opposed spacing members, and, finally, fitting insulating members within the majority at least of said apertures, the arrangement of said apertures and said insulating members being such that they are adapted to oppose axial compressive forces tending to move adjacent turns more closely together and to oppose tangential forces tending to cause relative movement between turns.

In an alternative method of manufacture the inductor is made of strip material, the spacing members being formed by cutting away portions of the turns.

One method of manufacturing an inductor embodying the present invention will now be described with reference to the accompanying drawing, by way of example, the inductor being designed for use in conjunction with signalling along power distribution systems. In the three figures of the accompanying drawing.

Figure 1:
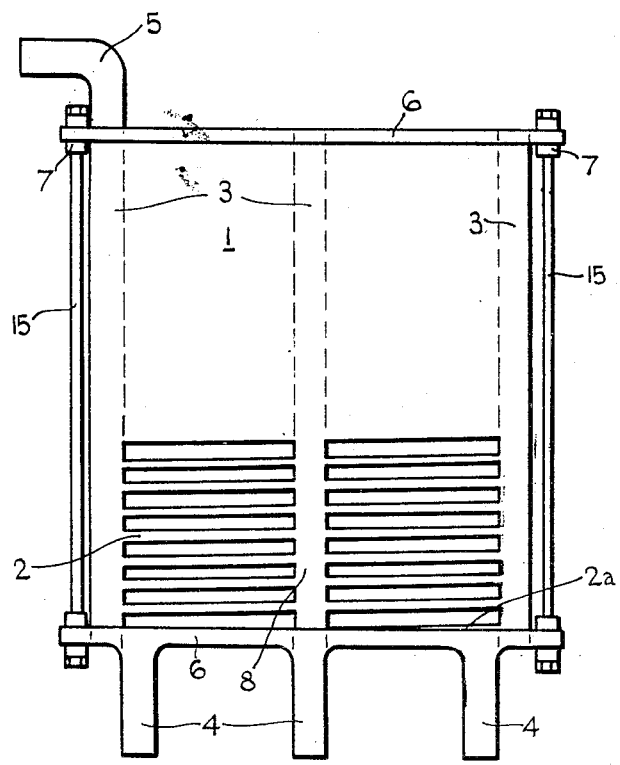
Figure 1 shows a side elevation of the casting from which the coil is made.
Figure 3:
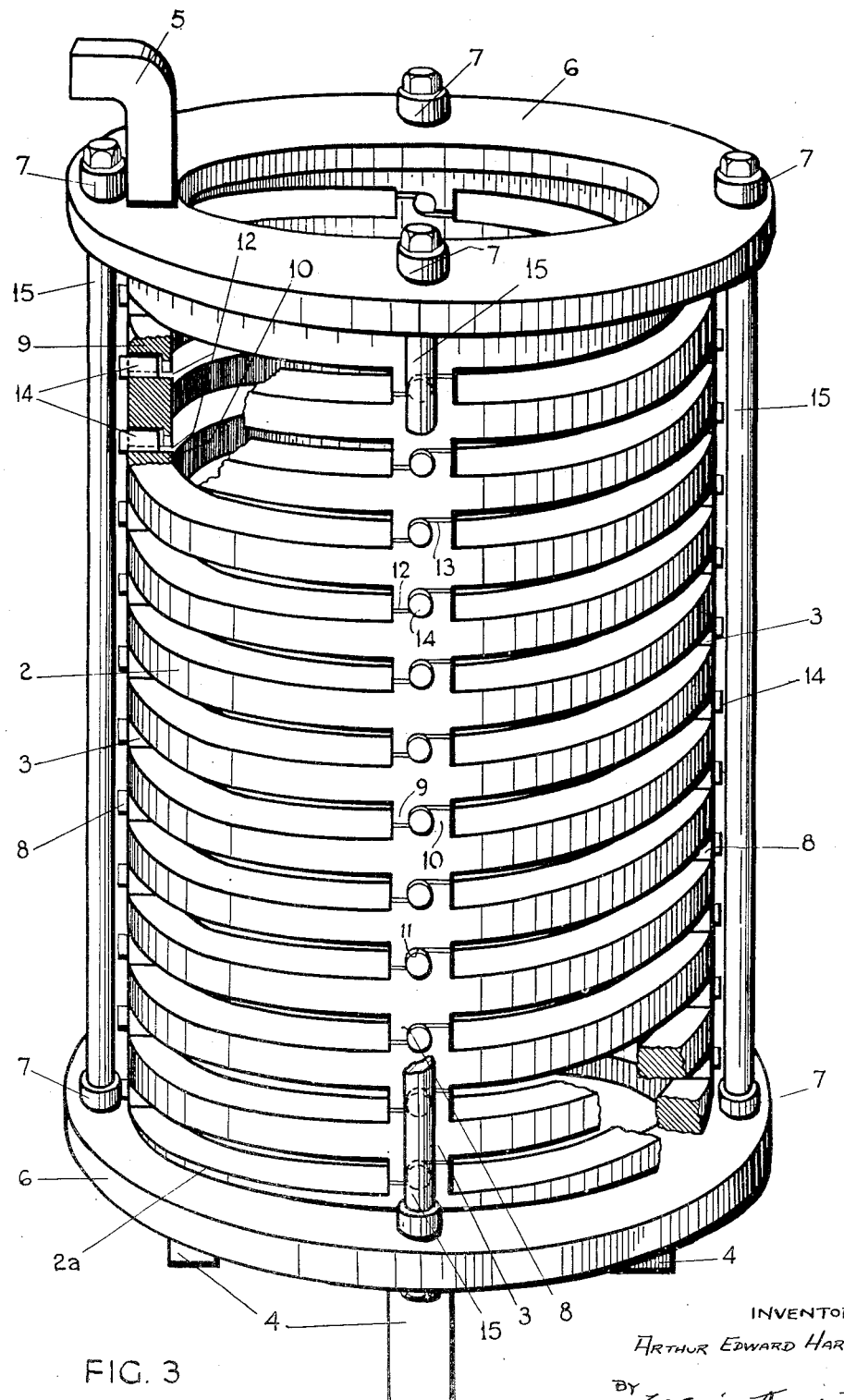
Figure 3 shows a perspective view of the complete inductor.

Referring to Figures 1 and 3, the first stage in the manufacture is the casting of a helical coil 1, for example of an aluminium alloy, the turns 2 being in strip form, that is rectangular in cross-section. Four longitudinal members 3, extending from end to end of the coil 1, are cast integral with the coil 1, the members 3 being spaced uniformly around the coil 1 with their longitudinal axes substantially parallel to the axis of the coil 1. The casting has four mounting lugs 4 at one end of the coil 1, and the lug 4 nearest the end of the last turn 2a is utilised as a lead-in connector. In addition the member 3 nearest the end of the last turn at the other end of the coil 1 is also extended to form a lead-in connector 5. It will be clear that the longitudinal members 3 may, in fact, consist only of webs connecting adjacent turns 2, with suitable lugs extending from the end turns. Flanges 6 are also cast integral with each of the end turns of the coil 1, each flange 6 being provided with four apertures spaced around the flange, which apertures are subsequently provided with bush insulators 7.

Figure 2:
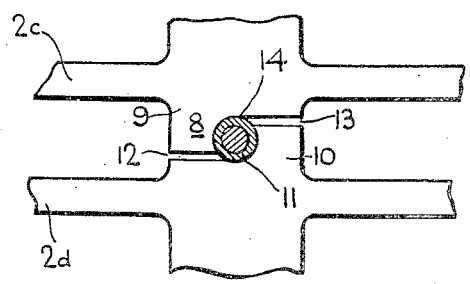
Figure 2 shows an enlarged view of parts of the finished coil in side elevation.

The portions 8 of the longitudinal members 3 lying between adjacent turns 2 are next cut so as physically to separate the turns 2 of the coil 1. Thus, by referring now to Figure 2 which shows an enlarged view of two typical adjacent turns 2c and 2d, the portion 8 is cut to form a pair of spacing members 9 and 10 which project from the two adjacent turns 2c and 2d respectively. Thus there are provided four pairs of opposed spacing members 9 and 10 between each pair of adjacent turns, the spacing members 9 and 10 being spaced circumferentially round the coil 1. The portions 8 of the longitudinal members 3 are cut by drilling a hole 11 centrally within the area of each portion 8, the diameter of the hole 11 being substantially less than the width of the portion 8, for example equal to one third of the width, and then making two saw cuts 12 and 13 substantially parallel to the turns 2 and tangential to the hole, that is to say the saw cut 12 extending from one side of the portion 8 to the bottom of the hole 11 whilst the other saw cut 13 extends from the other side of the portion 8 to the top of the hole 11. A rod 14 of insulating material is then fitted within the hole 11. Similar lengths of rod 14 are provided between each pair of spacing members 9 and 10 and, in order to secure the rods 14 firmly in position, tensioning rods or wires 15 are provided between opposing insulators 7 fitted to the flanges 6 at each end of the coil 1, the rods or wires 15 preferably being of a high resistance material, for example wires of nickel-chromium alloy.

The insulating rods 14 may be shaped to taper slightly and then driven into the holes 11 in the coil 1 so that the rods 14 are held in place in the finished coil by friction. Alternatively the rods 14 may be cylindrical, each hole 11 being provided with a small shoulder near its inner end and there being a tension rod 15 adjacent and parallel to each portion 8 so that movement of each rod 14 is restricted in one direction by the shoulder in the hole 11 and in the other direction by the rod 15. The insulating rods 14 should be able to withstand high temperature and may be made of porcelain.

The arrangement of the spacing members 9 and 10 and the insulating rods 14 are designed to counteract the heavy mechanical loads due to the currents flowing in the coil under fault conditions. As is well known, due to the strong magnetic fields set up within the coil 1 with excessive current flowing the coil 1 tends to close up axially whilst each turn 2 tends to open radially. These tendencies are resisted by the insulating rods 14 and the spacing members 9 and 10 which oppose both the axial compressive forces and the tangential forces tending to produce relative movement between the turns 2.

In one typical inductor according to the invention the cross-sectional dimensions of the turns was ½ of an inch by 1½ inches, the coil being approximately two feet long by one foot nine inches in external diameter.

In alternative methods of manufacture, which may be given by way of example, the coil may be cast with the spacing members preformed, that is so that no further machining is required, or the coil may be made from strip metal the turns being cut down and machined to form the required spacing members.

As the forces between the turns vary according to the position of the turns in the coil, it is possible by using a casting method to vary the thickness of each individual turn so that it may be proportioned to the probable mechanical loading to which it is likely to be exposed.

I claim:

1. An electrical inductor comprising a helical coil having a plurality of spacing members formed integrally with the coil so as to lie in pairs between adjacent turns, one spacing member of a pair projecting from one turn and the other from an adjacent turn, the two spacing members of each pair being in register and their opposing ends shaped so as to define a circular aperture while the two spacing members are separated by a pair of slots which lie substantially parallel to the coil turns and are tangential to, one on either side of, the said aperture, insulating members of circular cross-section fitted one into each of said apertures, and tensioning means engaging opposite ends of the coil and axially compressing the turns so as to force the spacing members against the insulating members, the said insulating members opposing both axial compressive forces tending to move adjacent turns more closely together and to oppose tangential forces tending to produce relative rotation between adjacent turns such as would cause them to open out radially.

2. An electrical inductor comprising a coil in which adjacent pairs of turns have co-operative projections projecting one from each of those turns in opposed relationship and each projection has a recess in the end thereof, the recesses of each pair of opposed co-operative projections facing one another and together defining an aperture, insulating members each lying in an aperture and engaging the recesses of a pair of opposed co-operative projections, and tensioning means axially compressing the turns and forcing the projections against the insulating members which also maintain the projections in register against tangential forces tending to enlarge the turns.

3. An electrical inductor comprising a coil having a plurality of spacing members formed integrally with the coil so as to lie in pairs between adjacent turns, one spacing member of a pair projecting from one turn and the other from an adjacent turn, the two spacing members of each pair being spaced apart and in register with each of their opposing ends recessed so as together to define an aperture, insulating members each fitted into one of said apertures, and tensioning means axially compressing the turns and forcing the spacing members against the insulating members which also maintain the spacing members in register against tangential forces tending to enlarge the turns.

4. An electrical inductor according to claim 3 wherein the said tensioning means comprises a plurality of elongated members tensioned between flanges formed integrally with the ends of the coil, and means to insulate the elongated members from the flanges.

5. An electrical inductor according to claim 4 wherein the said elongated members lie outside the coil.

6. An electrical inductor according to claim 3 wherein mounting lugs are formed integrally with the coil at one end thereof.

7. An electrical inductor according to claim 3 wherein the pairs of spacing members between the pairs of adjacent turns are disposed in a plurality of parallel rows which lie longitudinally of the coil.

8. An electrical inductor according to claim 7 wherein there are four parallel rows of spacing members.

9. An electrical inductor comprising a coil in which adjacent pairs of turns have facing registered co-operative opposed recesses, each pair of facing recesses together defining an aperture, insulating members each fitted into one of said apertures, and tensioning means engaging opposite ends of the coil and axially compressing the turns so as to force the turns against the insulating members and thus prevent enlargement of the diameters of the turns.

ARTHUR EDWARD HARROLD.

REFERENCES CITED

The following references are of record in the file of this patent:

UNITED STATES PATENTS

| Number | Name | Date |
|---|---|---|
| 1,994,534 | Robinson | Mar. 19, 1935 |
| 2,455,355 | Combs | Dec. 7, 1948 |
| 2,497,204 | Boterweg | Feb. 14, 1950 |

FOREIGN PATENTS

| Number | Country | Date |
|---|---|---|
| 49,472 | Norway | Oct. 19, 1931 |